(No Model.) 3 Sheets—Sheet 1.
G. F. CARD.
ELECTRIC MOTOR.
No. 382,589. Patented May 8, 1888.
*Fig. I.*
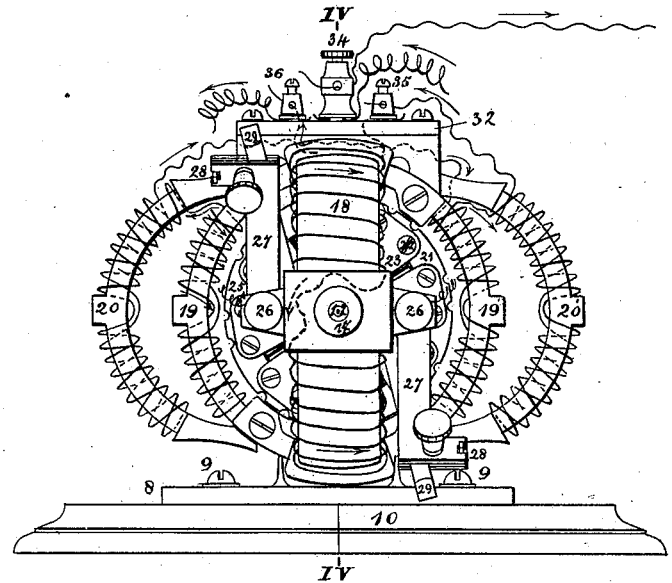
*Fig. II.*
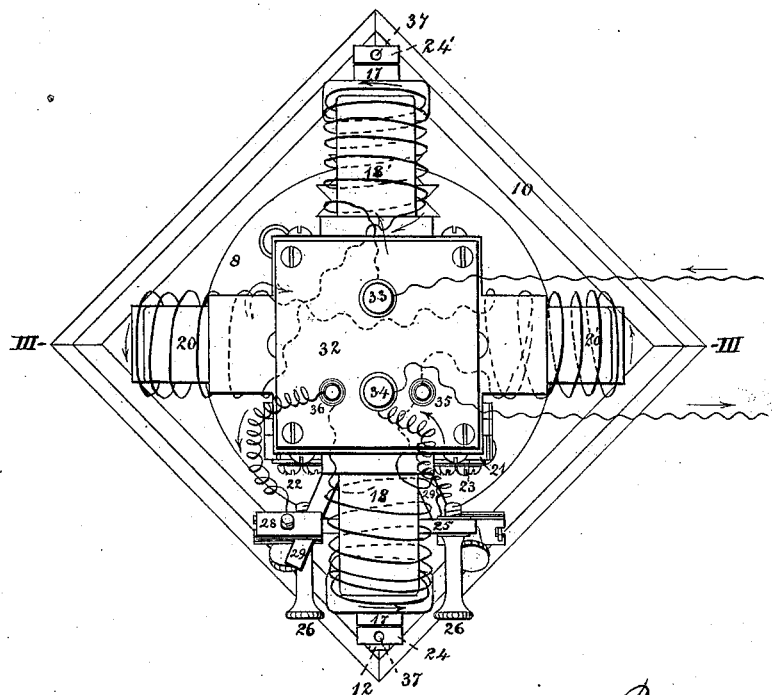
Attest:
Geo. H. Knight, Jr.
Emma Arthur.
Inventor
George F. Card.
By Knight Bros.
Attest (No Model.)  3 Sheets—Sheet 2.
G. F. CARD.
ELECTRIC MOTOR.
No. 382,589. Patented May 8, 1888.
*Fig. III.*
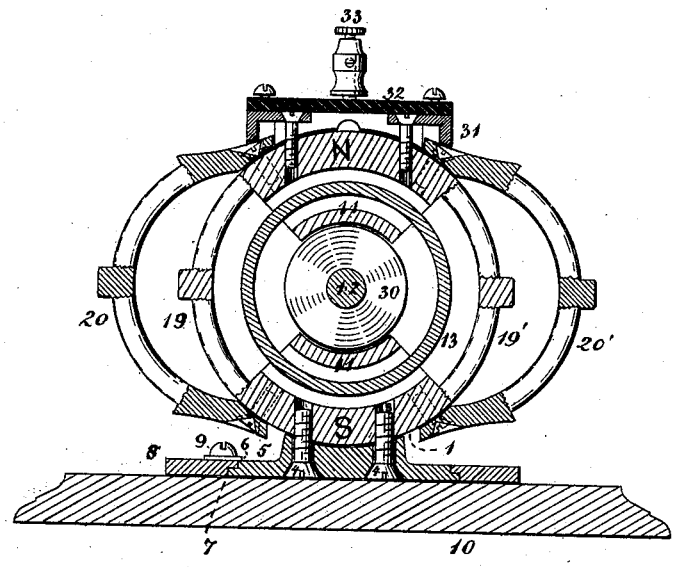
*Fig. IV.*
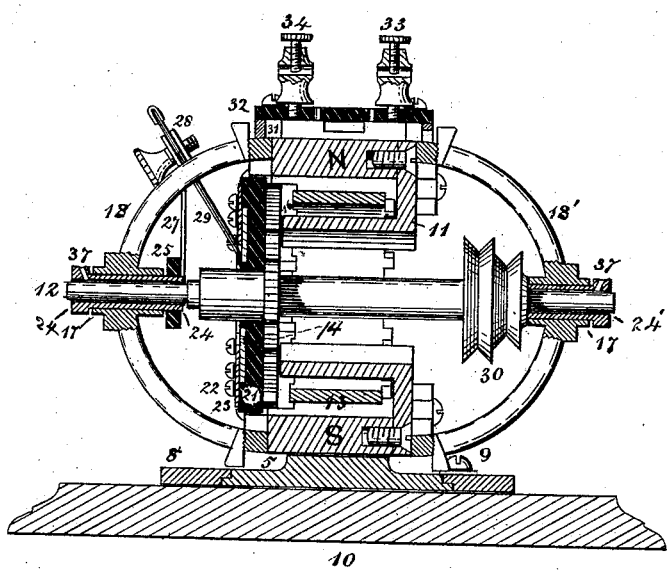
Attest:
Geo. H. Knight, Jr.
Emma Arthur
Inventor:
George F. Card.
By Knight Bros.
Attys.

(No Model.)  G. F. CARD.  3 Sheets—Sheet 3.
ELECTRIC MOTOR.
No. 382,589.  Patented May 8, 1888.
*Fig. V.*
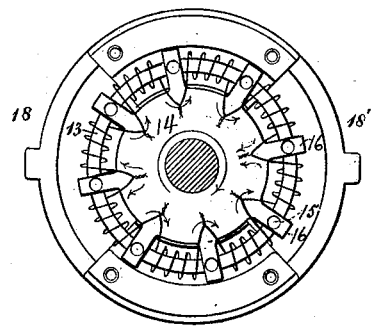
*Fig. VI.*
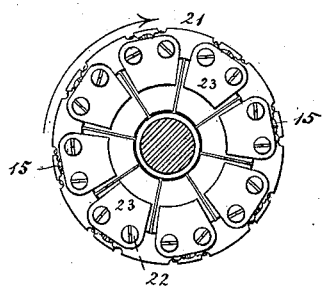
Attest:
Geo. H. Knight Jr.
Emma Arthur.
Inventor.
George F. Card,
By Knight Bros.
Attys.

UNITED STATES PATENT OFFICE.

GEORGE F. CARD, OF COVINGTON, KENTUCKY, ASSIGNOR TO THE GEORGE F. CARD MANUFACTURING COMPANY, OF SAME PLACE.

ELECTRIC MOTOR.

SPECIFICATION forming part of Letters Patent No. 382,589, dated May 8, 1888.

Application filed August 3, 1887. Serial No. 246,054. (No model.)

*To all whom it may concern:*

Be it known that I, GEORGE F. CARD, of Covington, Kenton county, Kentucky, have invented new and useful Improvements in Electric Motors, of which the following is a specification.

My invention relates to improvements in the class of electric dynamic engines or motors such as illustrated in my patent, No. 364,068, granted May 31, 1887; and it consists in features of useful novelty, hereinafter described and specified.

In the accompanying drawings, Figure I is a front elevation, and Fig. II is a top view, of an electric motor embodying my improvements. Figs. III and IV are vertical sections on the lines III III and IV IV, respectively. Figs. V and VI are front elevations of the armature and the commutator, respectively, the shaft to which they are both permanently attached being represented in transverse section.

In the above figures the "wiring," where shown, is represented conventionally.

1 is a ring-shaped iron casting whose thickened portions N S, constituting the field pole-pieces, are connected by curved bars or limbs 19 19'. Screw-threaded orifices 3 in one of these pole-pieces receive screws 4, by which the said annular casting is made fast to a foot, 5, of bronze or other non-magnetic metal. This foot may be of circular contour and have a rabbeted or chamfered margin, 6, which, being engaged beneath the undercut edge 7 of clamp 8, having screws 9, permits the motor to be so fastened to floor or bench 10 as to give its transmitting-sheaves 30 any desired presentation.

L-formed iron castings 11, being bolted to the rear side of the pole-pieces N S, serve as polar extensions around the rear edge and the interior periphery of the armature-ring 13, so as to almost completely inclose the same, and to thus reduce to a minimum the amount of "idle" wire in the armature-coils. Each of the pole-pieces, with its said appendage 11, presents in the transverse section a U-shaped contour whose interior indentation has, in the direction of the plane of the ring, the form of a circular arc concentric with the armature-shaft 12, so as to embrace as closely as possible, without touching the coils of, an armature-ring, 13, preferably of pure iron.

The armature-ring 13 is made fast to the shaft 12 through the instrumentality of a web or bearing-plate, 14, of bronze or other suitable non-magnetic material, (which is permanently fastened to the said shaft,) and of bolts 15, by which the said web is attached to protuberances 16 on the said ring.

Bolted or screwed to the portions N S in the plane of the armature-shaft, and having at their mid-heights orifices 17 for the reception of the journal-bearings 24 24' of said shaft, are two bow-formed iron bars or limbs, 18 18', which constitute with said portions a pair of electro-magnets. This pair of magnets constitutes a complete "field;" but to secure great strength and steadiness of field said pair is supplemented by two other pairs of limbs, 19 19', previously mentioned, and a pair, 20 20', which limbs are screwed to the portions N S in the plane of the armature's rotation. For this purpose these several limbs are "wired" in series with one another and with the armature and the external circuit, as indicated by small arrows in Figs. I, II, and V.

Bolted to the web 14 is a disk, 21, of vulcanite or other suitable non-conductor, to whose face are secured, by means of screws 22, the contact plates or sectors 23, of copper or other good conductor.

One journal-bearing, 24, projects interiorly from the limb sufficiently to support a bracket, 25, whose binding-posts 26, respectively, receive the positive and negative wires of the generator and afford said wires electrical connection with the brass arms 27 of the brush-holders, in whose terminal clips 28 are secured the copper strips ("brushes") 29, that, pressing against the commutator-sectors 23, on diametrically remote sides of the armature-shaft, serve to complete the connection. Said bracket 25 works on said bushing 24 with sufficient friction to retain the brushes to any plane of commutation at which the operator may set them.

The armature-shaft 12 is provided with any suitable device—such as grooved sheaves or pulleys 30—for transmitting the armature motion to the lathe or other object to be driven.

The considerably bowed-out form of the limbs 18 18′, besides placing the journal-bearings well apart, affords room within the curves for the described commutating and transmitting devices in readily-accessible positions for inspection, cleansing, repair, &c.

The field-ring 1 is surmounted by a saddle, 31, of bronze or other non-magnetic metal, which, being screwed fast to said ring, has screwed upon it a vulcanite cap, 32, to whose top are screwed the binding-posts 33, 34, 35, and 36.

The journal-bearings 24 24′, as also the shaft 12, are prolonged somewhat beyond the limbs 18 18′, and said prolonged portions of said bearings have orifices 37, to facilitate lubrication of the shaft-journals.

The above-described preferred form of my invention is susceptible of various modifications. For example, one or more pairs of supplementary magnet-limbs may be omitted, as may also be that portion of the pole-piece which extends within the armature-ring, and portions of the field-wiring may, for certain purposes, be arranged in shunt or in multiple arc, or even wound differentially; but inasmuch as I have in contemplation forms of motor employing such modifications no more specific description is here needed.

While my improvements have been chiefly designed for and are here represented in electric motors or engines for conversion of electrical to mechanical energy, the right is nevertheless reserved to apply them, so far as they may be applicable, to dynamo-electric engines or current-generators.

I claim as new and of my invention—

1. The combination, in an electric motor, of the following elements, to wit: a rotatable armature, two diametrically-remote pole-pieces which embrace three sides of the armature-bobbins, and which are magnetically connected by a pair of limbs in the plane of the armature-shaft, and which constitute its journal-bearings, and one or more limbs in the plane of rotation, all of said limbs being wound in series with one another and with the armature and the outer circuit, substantially as set forth.

2. In an electric motor, the combination, with armature 13, of three pairs of electromagnetic limbs, 18 18′, 19 19′, 20 20′, that on diametrically-opposite sides of the armature unite in pole-pieces N S, which embrace three sides of the armature-bobbins, said limbs being so wound as to be in series with each other and with the armature and the external circuit and to produce contrary polarity in said pole-pieces.

3. In an electric motor, the combination, with an armature, 13, of three pairs of electromagnetic limbs, 18 18′, 19 19′, 20 20′, that on diametrically-opposite sides of the armature unite in pole-pieces N S, one pair being fixed at right angles to the other two, and all being wound so as to be in series with each other and with the armature and the external circuit, and so as to produce opposite polarity in said pole-pieces.

4. In an electric motor, the combination of clamp-ring 8, rabbeted foot 5, field-ring N S, 19 19′, non-magnetic saddle 31, and the non-conducting cap 32, supporting the binding-posts 33, 34, 35, and 36.

In testimony of which invention I hereunto set my hand.

GEORGE F. CARD.

Attest:
 GEO. H. KNIGHT,
 HENRY G. LEWIS.